(12) United States Patent  
Sudo

(10) Patent No.: US 6,285,368 B1
(45) Date of Patent: Sep. 4, 2001

(54) IMAGE DISPLAY SYSTEM AND IMAGE DISPLAY APPARATUS AND INFORMATION PROCESSING APPARATUS IN THE SYSTEM

(75) Inventor: Toshiyuki Sudo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/017,291

(22) Filed: Feb. 2, 1998

(30) Foreign Application Priority Data

Feb. 10, 1997 (JP) .................................................. 9-026853

(51) Int. Cl.⁷ .................................................. G06T 15/00
(52) U.S. Cl. .......................................... 345/419; 345/418
(58) Field of Search .................................. 345/418, 419, 345/424, 425, 428, 429

(56) References Cited

U.S. PATENT DOCUMENTS

| 5,875,055 | 2/1999 | Morishima et al. | 359/465 |
| 6,025,847 | * 2/2000 | Marks | 345/419 |
| 6,031,538 | * 2/2000 | Chupeau et al. | 345/419 |

FOREIGN PATENT DOCUMENTS

| 0540137 | 5/1993 | (EP) . |
| 0751690 | 1/1997 | (EP) . |
| 5-122733 | 5/1983 | (JP) . |
| 3-119889 | 5/1991 | (JP) . |
| 09015532 | 1/1997 | (JP) . |

OTHER PUBLICATIONS

"Theory of Parallax, Barriers", Sam H. Kaplan, Journal of SMPTE, vol. 59, No. 7, pp. 11–21, Jul. 1952.

* cited by examiner

Primary Examiner—Cliff N. Vo
(74) Attorney, Agent, or Firm—Fitzpatrick, Cella, Harper & Scinto

(57) ABSTRACT

An image display system includes a display capable of performing mixed display of 2D and 3D images and a host computer for supplying image data to the display. An image source generation unit of the host computer generates image data to be displayed on the display. A 3D display position/area information generation unit generates area information indicating the 3D image area of the image data. A display mode setting unit generates display mode information on the basis of the setting indicating whether to perform mixed display. In the display, when a display mode detection unit detects the execution of mixed display from the display mode information, a 3D display position/area control unit ensures a 3D display area in accordance with the area information, and an image display unit performs mixed display.

50 Claims, 12 Drawing Sheets

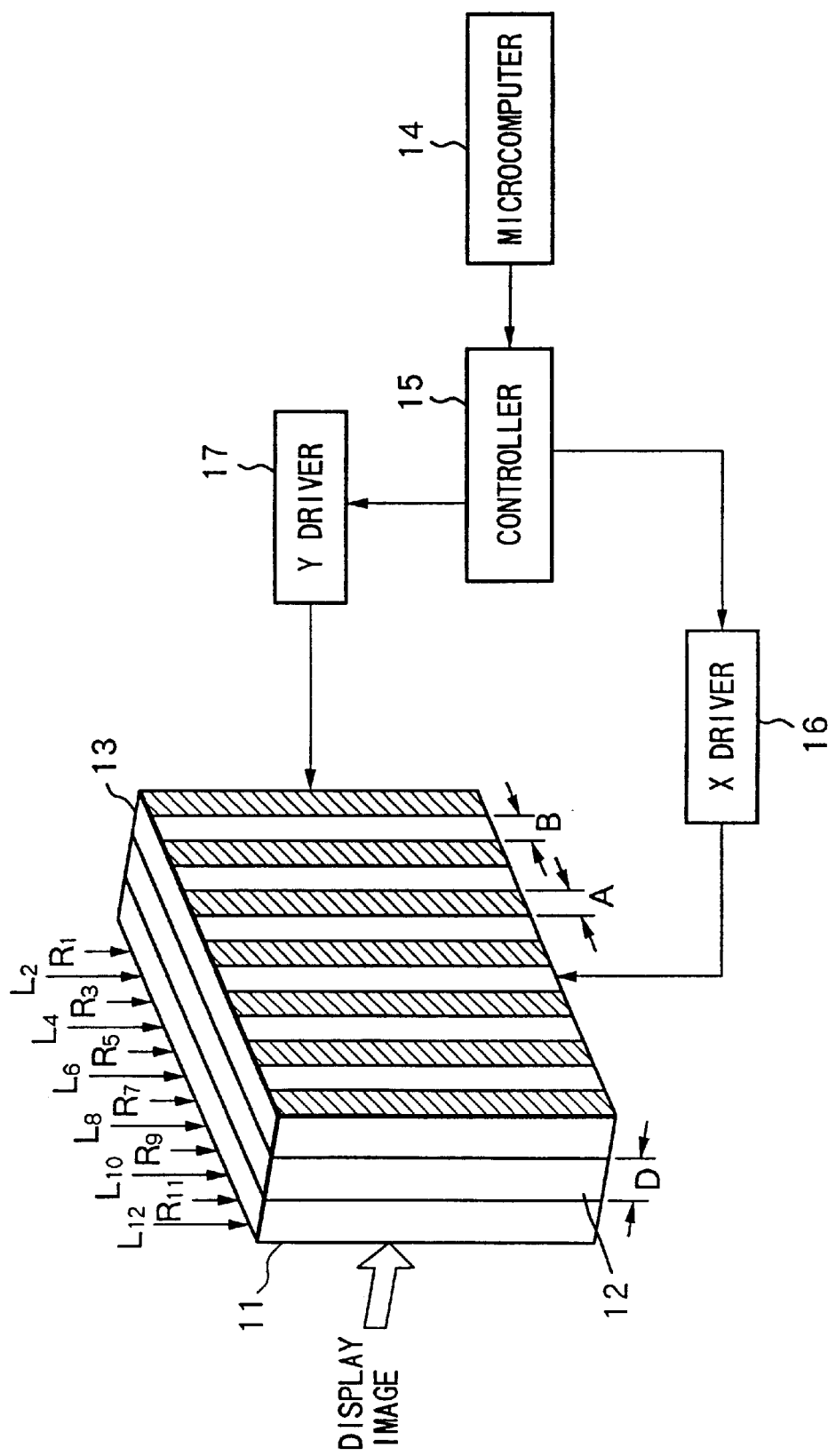

IMAGE DISPLAY SYSTEM AND IMAGE DISPLAY APPARATUS AND INFORMATION PROCESSING APPARATUS IN THE SYSTEM

BACKGROUND OF THE INVENTION

1. Field of the Invention

The present invention relates to an image display system including an image display apparatus which allows an observer to observe a stereoscopic image by using the parallax between the right and left eyes of the observer and a control apparatus for controlling the display apparatus, and a control method therefor and, more particularly, to an image display system for providing an operation environment for comfortable stereoscopic display, an image display apparatus and an information processing apparatus in the system, and a control method and a storage medium used in the apparatuses.

2. Related Background Art

A lenticular scheme and a parallax barrier scheme have been proposed as schemes for stereoscopic image display apparatuses using neither shutter glasses nor polarization glasses. In these apparatuses, special optical elements such as lenticular lenses and parallax barriers are generally placed on the front surface sides of display devices. These special optical elements are relatively inexpensive and exhibit high productivity. A simple stereoscopic image display apparatus can be easily constituted by a combination of such an optical element and a 2D display. These schemes are means especially effective for liquid crystal display devices (LCDs) and the like having flat display surfaces.

For example, the parallax barrier scheme is disclosed in S. H. Kaplan, "Theory of Parallax Barriers.", J. SMPTE, Vol. 59, No. 7, pp. 11–21 (1952). According to this scheme, a vertically striped image obtained by alternately arranging at least right and left images of a plurality of parallax images from a plurality of viewpoints into a vertically striped pattern is observed through a slit pattern (called a parallax barrier) having predetermined opening portions placed at a predetermined distance from this image. With this operation, the right and left images of the vertically striped image are independently observed with the right and left eyes. As a result, parallax images corresponding to the right and left eyes are observed with the right and left eyes, thus realizing a stereoscopic view.

Japanese Patent Laid-Open Nos. 3-119889 and 5-122733 disclose stereoscopic display apparatuses in which a parallax barrier is electronically generated by a transmission type liquid crystal display device and the like, and the shape and position of each stripe are variably controlled to improve the compatibility with conventional 2D image display apparatuses.

FIG. 11 shows the basic arrangement of the stereoscopic image display apparatus disclosed in Japanese Patent Laid-Open No. 3-119889. This stereoscopic image display apparatus includes a transmission type liquid crystal display apparatus 11 for displaying parallax images and an electronic parallax barrier 13 constituted by a transmission type liquid crystal display placed on the liquid crystal display apparatus 11 through a spacer 12 having a thickness D. A parallax barrier pattern is displayed on the electronic parallax barrier 13. Note that a stereogram having, for example, right and left parallax images alternately arranged into a vertically striped pattern is displayed on the liquid crystal display apparatus 11. The spacer 12 is made of transparent glass, acrylic resin, or the like.

In this stereoscopic image display apparatus, a vertically striped image consisting of parallax images sensed from two or more directions is displayed on the liquid crystal display apparatus 11, and a parallax barrier pattern is formed at an arbitrary position on the barrier surface of the electronic parallax barrier 13 upon designation of X and Y addresses by a control means such as a microcomputer 14, thereby allowing a stereoscopic view based on the principle of the above parallax barrier scheme.

In this apparatus, when the display of the parallax barrier pattern on the electronic parallax barrier 13 is stopped to make the entire image display area of the electronic parallax barrier 13 colorless and transparent, 2D image display can be performed. The compatibility between 2D display and 3D display is realized in this manner.

An apparatus capable of performing mixed display of 3D and 2D images within a single plane is disclosed in Japanese Patent Laid-Open No. 5-122733. In this apparatus, as shown in FIGS. 12A and 12B, a barrier striped pattern can be generated in the entire area or a partial area of the electronic parallax barrier 13.

When a 3D display capable of performing mixed display of 2D and 3D images is to be used, a system for controlling 2D and 3D display areas in accordance with the needs of the user is required. When the image information generated by a computer is to be displayed, in particular, it becomes necessary to draw several windows on the screen of the display apparatus and selectively set the 2D and 3D display modes in units of windows. No conventional computer systems can serve such a purpose.

SUMMARY OF THE INVENTION

The present invention has been made in consideration of the above problems, and has as its object to provide an image display system for providing an operation environment for allowing proper setting of a display area for a 3D image in an image display apparatus capable of performing mixed display of 2D and 3D images, and an image display apparatus and an information processing apparatus in the system.

It is another object of the present invention to allow setting of a display mode indicating whether to perform mixed display of 2D and 3D images so as to allow more flexible setting of mixed display.

It is still another object of the present invention to allow setting of 2D and 3D image display modes in units of windows in displaying a plurality of windows.

It is still another object of the present invention to allow automatic display setting for 2D and 3D display modes in units of windows by using information about windows which is exchanged between an operating system and an application program.

In order to achieve the above objects, according to the first aspect of the present invention, there is provided an image display system including an image display apparatus capable of mixed display of 2D and 3D images, comprising first generation means for generating image data to be displayed on the image display apparatus, second generation means for generating area information indicating a 3D image area of the image data generated by the first generation means, and control means for controlling 2D image display and 3D image display performed by the image display apparatus, on the basis of the area information.

According to a preferred aspect of the present invention, the above image display system further comprises third generation means for generating display mode information indicating whether to perform mixed display of 2D and 3D images, and the control means controls 2D image display and 3D image display performed by the image display apparatus when the display mode information indicates execution of mixed display.

According to another preferred aspect of the present invention, in the above image display system, the image data corresponds to multi-window display, and the second generation means acquires information about window display which is to be exchanged between an application program and an operating system, and generates the area information on the basis of the information about window display.

In addition, according to the present invention, there is provided an image display apparatus and an information processing apparatus suited to the above image display system.

Furthermore, according to the present invention, there is provided a control method for the above image display system, image display apparatus, and information processing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a block diagram showing the basic arrangement of a stereoscopic image display apparatus of the parallax barrier scheme.

DETAILED DESCRIPTION OF THE PREFERRED EMBODIMENT

Preferred embodiments of the present invention will now be described in detail in accordance with the accompanying drawings.

A display system according to this embodiment includes a stereoscopic display apparatus capable of performing mixed display of 2D and 3D images and a host computer for controlling the apparatus.

Figure 1:
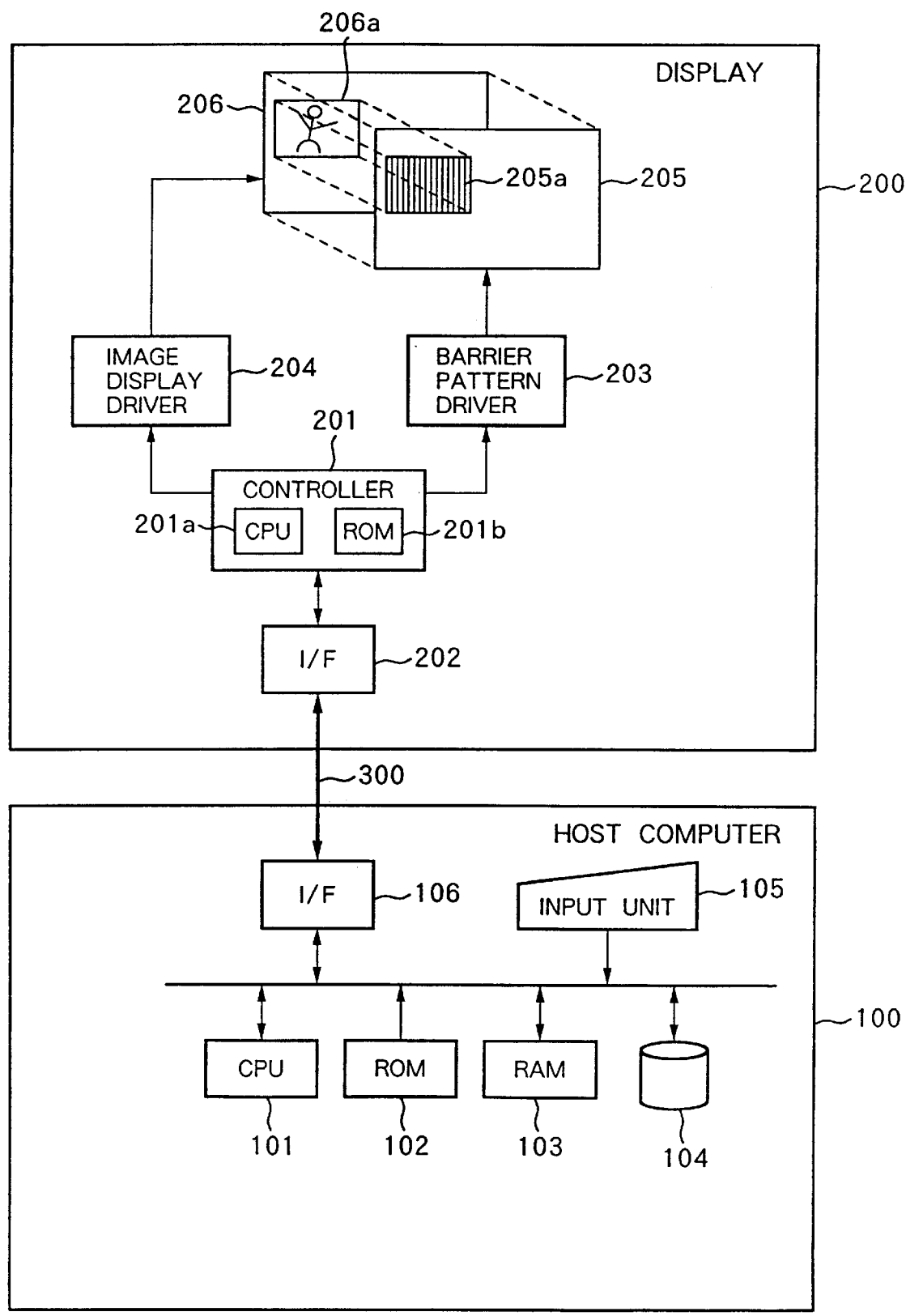
FIG. 1 is a block diagram showing the schematic arrangement of a display system according to an embodiment of the present invention.

FIG. 1 is a block diagram showing the schematic arrangement of the display system of this embodiment. Referring to FIG. 1, reference numeral 100 denotes a host computer; and 200, a display capable of stereoscopic display. Note that the display 200 uses the above electronic parallax barrier, can perform mixed display of 2D and 3D images, and allows a stereoscopic view at an arbitrary position. The stereoscopic view scheme applied to the display 200 is not limited to the parallax barrier scheme, and another scheme may be used.

In the host computer 100, a CPU 101 realizes various types of control operations in accordance with the control programs stored in a ROM 102 or a RAM 103. Reference numeral 104 denotes an external memory constituted by a hard disk or a floppy disk, in which an operating system (to be referred to as an OS hereinafter), application programs, and the like are stored. The control programs stored in the external memory 104 are loaded into the RAM 103 and executed by the CPU 101. Reference numeral 105 denotes an input unit constituted by a keyboard, a pointing device (a mouse in this embodiment), and the like; and 106, a display interface for communicating "image source information", "display mode information", and "3D display position/area information" with the display 200. The contents of these data will be described later.

In the display 200, a controller 201 includes a CPU 201a, a ROM 201b, and the like and performs various control operations for the display 200. Reference numeral 202 denotes an interface for performing data communication with the host computer 100; 205, an electronic parallax barrier (corresponding to the electronic parallax barrier 13 described in "RELATED BACKGROUND ART") constituted by a transmission type liquid crystal display for displaying a parallax barrier pattern; 206, a liquid crystal display for displaying 2D and 3D images (corresponding to the transmission type liquid crystal display apparatus 11); 203, a barrier pattern driver for driving the electronic parallax barrier 205 to display a pattern; and 204, an image display driver for driving the liquid crystal display 206 to display an image. Note that a spacer (not shown; corresponding to the spacer 12 described in "RELATED BACKGROUND ART") is arranged between the electronic parallax barrier 205 and the liquid crystal display 206. Reference numeral 300 denotes a connection cable for connecting the interfaces 106 and 202 to each other.

Figure 2:
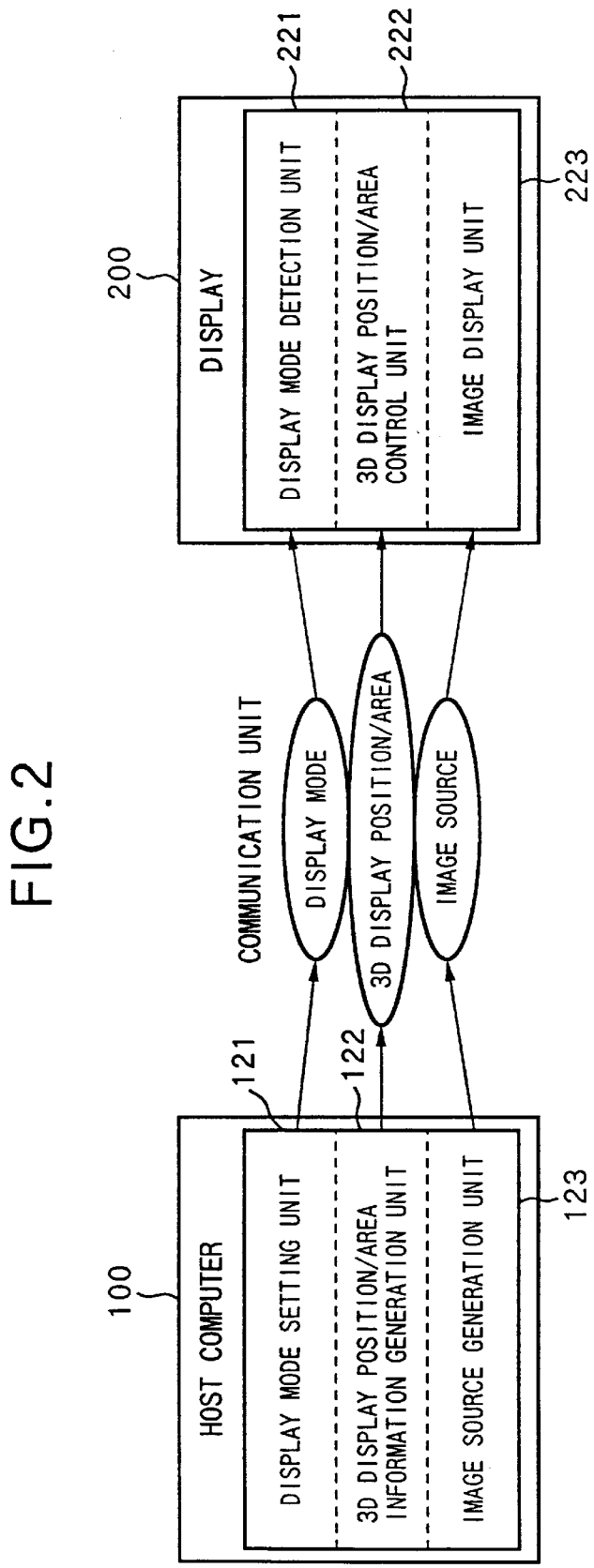
FIG. 2 is a block diagram for explaining the functional arrangement of the display system of this embodiment.

FIG. 2 explains the functional arrangement of the display system of this embodiment. The operation of the embodiment will be described below with reference to FIG. 2.

This display system is constituted by the host computer 100, the display 200, and a communication unit for performing data communication therebetween. The communication unit is a portion for exchanging signals between the host computer 100 and the display 200, and includes the interfaces 106 and 202 and the connection cable 300.

The host computer 100 includes a display mode setting unit 121 for generating display mode information, a 3D display position/area information generation unit 122 for generating 3D display position/area information, and an image source generation unit 123 for generating image source information. Note that the above respective functions in the host computer 100 are implemented when the CPU 101 executes the control programs loaded into the RAM 103. The 3D display position/area information indicates both the position and size of a 3D display portion, and has, for example, a data configuration of (x, y, width, height)= (x-coordinate on upper left portion of window, y-coordinate on upper left portion of window, window width, window height). Note that 3D display position/area information and the 3D display position/area information generation unit 122 will be respectively referred to as 3D display information and the 3D information generation unit 122 hereinafter.

Figure 3:
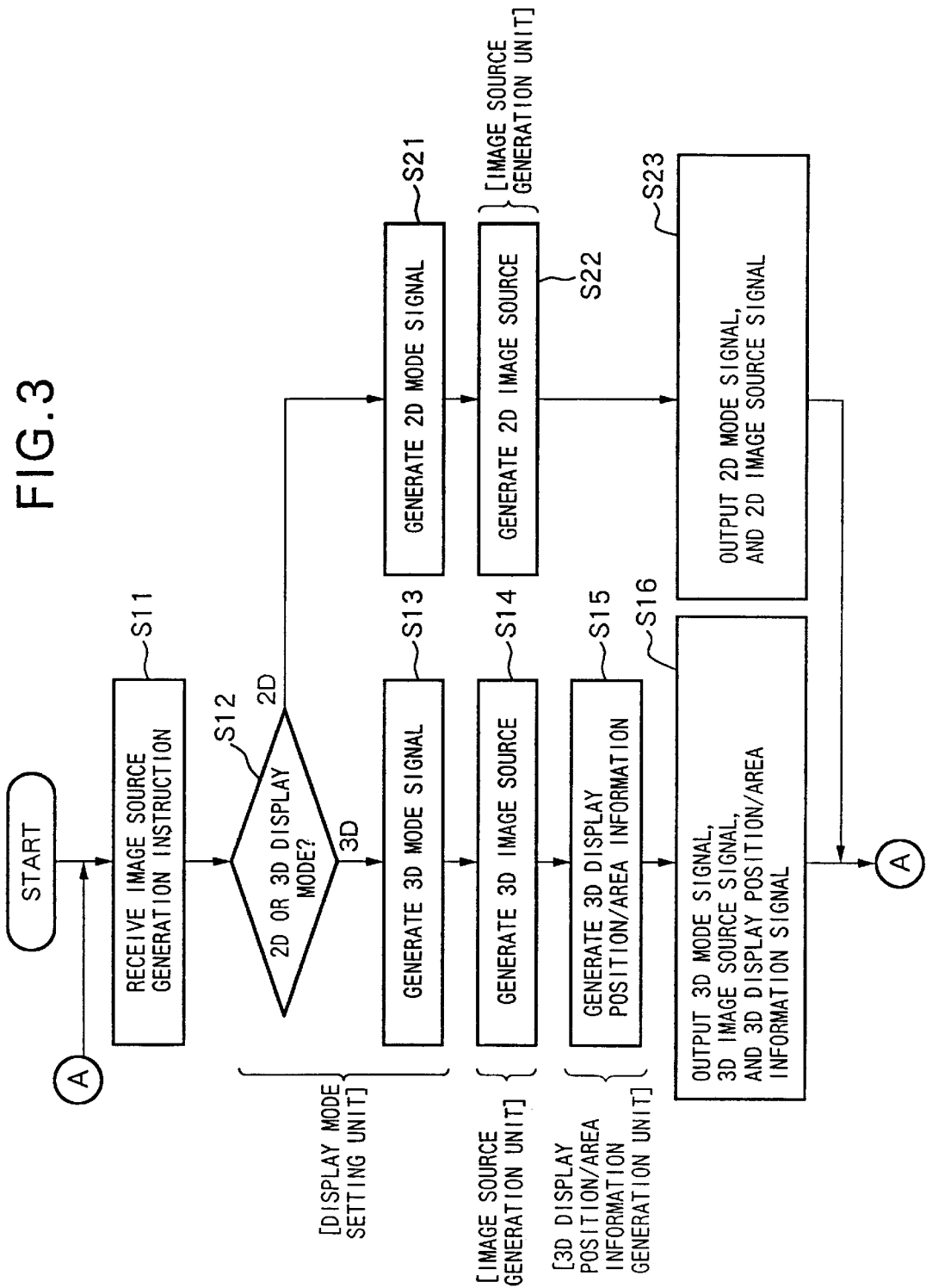
FIG. 3 is a flow chart showing a procedure for generating data for image display in a host computer.

FIG. 3 is a flow chart showing a procedure for generating data for image display in the host computer 100.

When an image source generation instruction is received in step S11, the flow advances to step S12. Display mode information is generated by the display mode setting unit 121. The display mode setting unit 121 discriminates whether the user of this system is demanding the 2D display mode or the mixed 2D/3D display mode (to be referred to as the 3D display mode hereinafter), and generates different types of display mode information (a 2D mode signal and a 3D mode signal in this embodiment) depending on the discrimination result (steps S13 and S21). Note that mode setting is implemented by a hardware switch, a menu operation, and the like, as will be described later with reference to FIGS. 5 to 9.

If the 3D display mode is selected as the current display mode, the computer causes the image source generation unit 123 and the 3D information generation unit 122 to generate a 3D image source signal and a 3D display information signal, respectively (steps S14 and S15). As a result, the three types of signals, i.e., the 3D mode signal, the image source signal, and the 3D display information signal, are transmitted to the display (step S16). In this case, the 3D display information signal contains information associated with the area and position where 3D display is to be performed (a procedure for generating this signal will be described in detail later with reference to FIG. 10). The 3D image source signal in this case is a signal having a 3D display image source in at least a portion of an image source. This signal contains an image signal mixture of 2D and 3D image signals.

If the 2D display mode is selected as the current display mode, the image source generation unit 123 generates 2D image source information (step S22). In the 2D display mode, since there is no need to generate a 3D display information signal, the 3D information generation unit 122 is not used. As a result, the two types of signals, i.e., the 2D mode signal and the 2D image source signal, are transmitted to the display (step S23).

In step S22, image data corresponding to 3D image display may be converted into a 2D image source signal. When, for example, image data consisting of right and left parallax images alternately arranged into a vertically striped pattern is to be used, it suffices to generate image data designed to display right or left parallax images two stripes at a time.

The format of the image source information output from the host computer 100 depends on the processing system on the display side which receives the signal and the manner in which the display distributes right/left-eye parallax values to the right and left eyes of the observer in displaying an image. If, for example, the image display unit of the display can process only the same general image signal (e.g., a VGA signal or an NTSC signal) as that in a conventional 2D display, the host computer 100 outputs an image source signal having a format corresponding to such a signal. If a special image signal (2D image signal+right/left-eye parallax signal or the like) for a 3D display can be processed and displayed by the image display unit, the host computer 100 outputs an image source signal having a format suited to the processing system. If the display is of the type that realizes a stereoscopic vision by the liquid crystal shutter glasses scheme, the "3D image source" becomes a "time-division parallax image source" designed to switch right and left parallax images in synchronism with the ON/OFF period of the liquid crystal shutter. If the display is based on the "parallax barrier scheme" or the "lenticular scheme", a "parallax striped image source" having right and left parallax images alternately arranged into a vertically striped pattern is used.

The various types of signals generated by the host computer 100 in the above manner are sent to the display 200 through the communication unit. The communication unit is constituted by the interfaces (to be referred to as the I/Fs hereinafter) 106 and 202 and the connection line, which connect the computer and the display to each other. Of the above signals, the image source information is generally sent from the standard output I/F (e.g., a D-sub connector) of the computer to the display which is connected to the computer through a general display cable. In the system of this embodiment, however, since the display mode information and the 3D display information must also be transmitted to the display, these signals are transmitted by using the following I/Fs.

Serial or Parallel Port

A general computer has a serial port (RS232C) and a parallel port as digital signal output means. The above signals can be output to the display by using these ports. Digital signal output from the respective ports are generated by software on the PC and PC hardware.

Next-generation Digital I/F

Several next-generation I/Fs for connecting computers and peripheral devices to each other have been proposed. IEEE1394 and USB are typical examples. Although only a minority of PCs are equipped with these I/Fs at present, it is expected that such PCs will increase in number in the future. IEEE1394 in particular is a high-speed, broadband digital I/F with excellent image signal transmission performance, which can transmit the above three types of signals from the computer to the display at once. Dedicated digital I/Fs for connecting computers and displays have also been proposed. When such an I/F is to be used, display mode information and 3D display information are transmitted by using a signal transmission area of this I/F other than an image signal transmission area.

Standard Video Output

As a standard I/F for connecting a computer and a display, an analog signal output I/F designed to transmit only image signals is currently used. For example, a connection cable of the D-sub scheme which is the standard video output of a DOS/V PC uses 15 pins as terminals. Of these 15 pins, however, only about six pins are used to transmit an image signal, and about nine remaining pins are not used. If, therefore, these unused pins are used to transmit signals other than image signals, the two other types of signals can be transmitted at the same time while the conventional standard video output I/F cable is used.

Extension I/F Board

If there is no I/F suited to the computer, a dedicated extension I/F board can be mounted in the computer to be used for connection to the display. When a dedicated I/F board is to be used for this system, the use environment of the display can be made more comfortable by adding the function of helping the generation of the above three types of information, i.e., display mode information, 3D display information, and image source information, to the I/F board.

The operation of the display 200 will be briefly described next. The display 200 includes a display mode detection unit 221, a 3D display position/area control unit 222, and an image display unit 223 as signal processing units for executing processes using the above signals. A display mode signal, a 3D display information signal, and an image source signal are respectively used by the display mode detection unit 221, the 3D display position/area control unit 222, and the image display unit 223. Note that the functions of these units are implemented when the CPU 201a in the controller 201 executes the control programs stored in the ROM 201b. The 3D display position/area control unit 222 will be referred to as the 3D display control unit 222 hereinafter.

Figure 4:
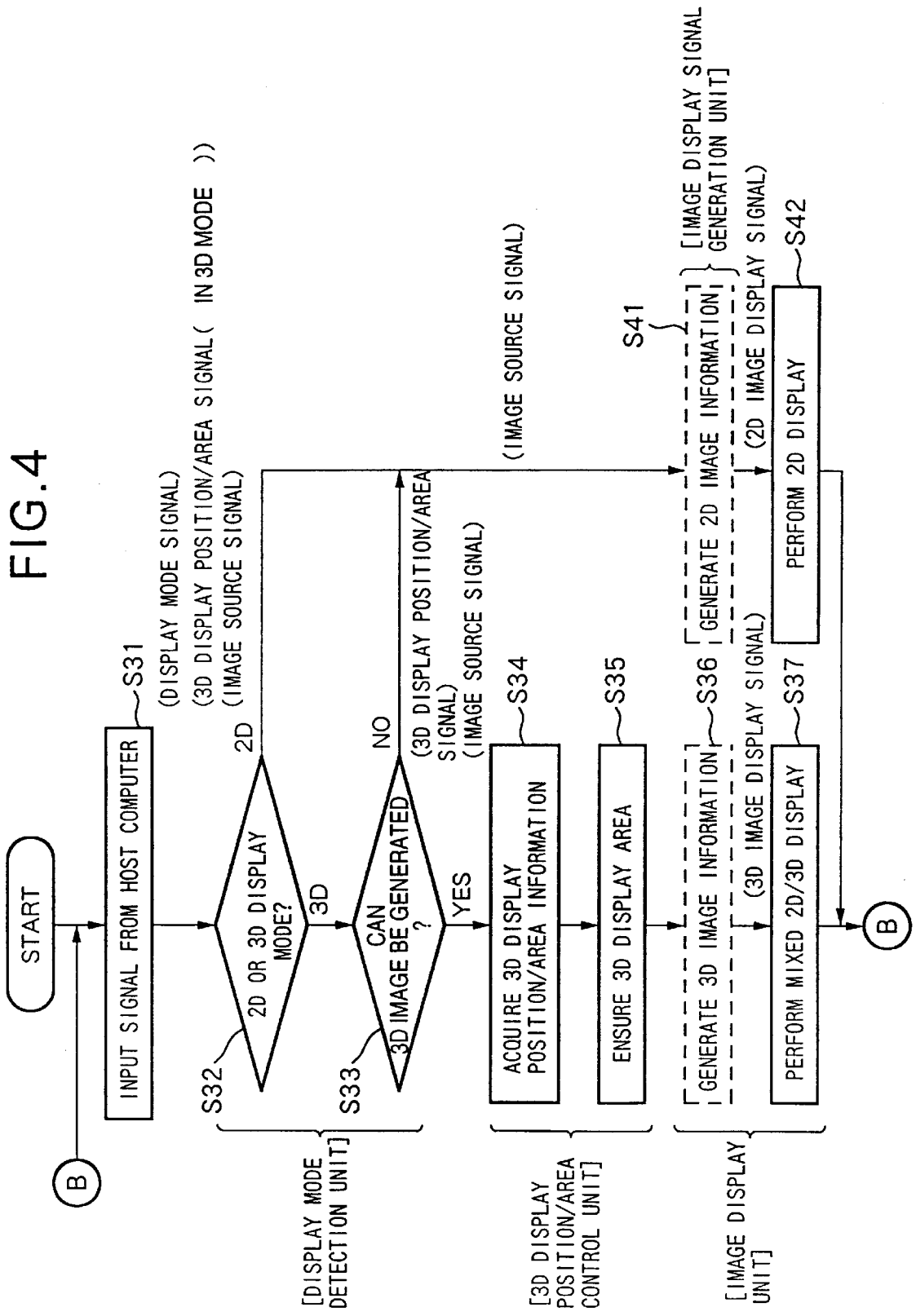
FIG. 4 is a flow chart showing an operation procedure in a display in this embodiment.

FIG. 4 is a flow chart showing an operation procedure in the display of this embodiment. Note that the processing shown in FIG. 4 is implemented when the CPU 201a executes the control programs stored in the ROM 201b.

In step S31, signals representing display mode information, 3D display information, and image source information are input from the host computer 100. In step S32, of the signals input to the display 200, the display mode information is processed by the display mode detection unit 221. In this step, it is discriminated whether the display mode selected by the user is the 2D or 3D display mode.

If it is discriminated that the 2D display mode is selected, the flow shifts to the 2D display routine after step S41. In the 2D display routine, the image source signal is sent to the image display unit to be processed. As described above, the image source signal output from the computer may have a format selected from a plurality of formats. In some case, therefore, the image source signal must be converted into a signal having an optimal format for image display within the image display unit 223 of the display 200. In this case, the above format conversion indicated by the dotted line in FIG. 4 is performed by the "image display signal generation unit" (step S41). In step S42, image display is performed. In this case, the entire display surface of the electronic parallax barrier 205 is set in a transparent state without displaying any barrier pattern thereon, and a 2D image is displayed on the liquid crystal display 206. Obviously, if the above format conversion need not be performed, 2D display based on the image source is performed in step S42 without the mediacy of the "image display signal generation unit".

If it is discriminated that the 3D display mode is set, it is further discriminated whether the image source is capable of generating a 3D image (step S33). This discrimination is performed by checking whether the signal from the host computer contains the 3D display information signal generated by the 3D information generation unit 122. If it is discriminated that a 3D image cannot be generated (there is no 3D display information), the flow shifts to the above 2D display routine. If it is discriminated that a 3D image can be generated, the flow shifts to the 3D display routine after step S34.

In the 3D display routine, 3D display position/area control is performed concurrently with image display (image display and 3D display position/area control are processes to be performed in an arbitrary order. They may be processed concurrently).

The 3D display information signal is processed by the 3D display control unit 222. First of all, pieces of information about the 3D display position and area are acquired (step S34). The 3D display control unit 222 further performs processing on the basis of these pieces of information to ensure a display area (step S35).

The above control operation will be described in detail. The display 200 displays a vertically striped image consisting of parallax images sensed from two or more directions on the liquid crystal display 206, and forms a parallax barrier pattern at/in an arbitrary position/area on the electronic parallax barrier 205 constituted by a liquid crystal display stacked on the liquid crystal display 206, thereby realizing a stereoscopic vision on the basis of the principle of the parallax barrier scheme. In the colorless, transparent area, on the electronic parallax barrier 205, on which no barrier pattern is displayed, the 2D image displayed by the liquid crystal display 206 can be observed as it is. As a result, the 3D image can be observed in the area on the electronic parallax barrier 205 on which the parallax barrier pattern is displayed, whereas the 2D image can be observed in the remaining area.

When the above 3D display is used, since the above 3D display information has been acquired by the 3D display control unit 222, the barrier pattern is displayed at/in only the corresponding position/area on the electronic parallax barrier 205, but the remaining area is kept in a colorless, transparent state. If, for example, the 3D display information indicates an area 205a, the barrier pattern is displayed in only the area 205a. In this manner, both a 2D display area and a 3D display area can be ensured.

The image display unit 223 performs signal processing for 3D display (including mixed 2D/3D display) on the basis of the sent image source signal. As described above, the image source signal output from the computer may have a format selected from a plurality of formats. In some case, therefore, the image source signal must be converted into a signal having an optimal format for image display within the image display unit of the display. In this case, the format conversion indicated by the dotted line in FIG. 4 is performed by the "image display signal generation unit" (step S36), and image display is executed (step S37). At this time, image display signals for 2D and 3D display areas are generated on the basis of the above 3D display information. Referring to FIG. 1, for example, a 3D image (an image consisting of right and left parallax images alternately arranged into a striped pattern in this embodiment) is displayed in an area 206a, and a 2D image is displayed in the remaining area. In this case, the areas 205a and 206a correspond to the display areas determined by the 3D display information, and the 3D image is observed in these areas.

Obviously, if the above format conversion is not required, image display is performed by using the image source signal as an image display signal without the mediacy of the "image display signal generation unit".

As described above, according to this embodiment, there is provided a display system including a stereoscopic image display apparatus capable of switching the 2D and 3D display modes in accordance with the intention of the user and automatically performing mixed display of 2D and 3D images, and a host computer for controlling the display apparatus.

A method of generating display mode information and 3D display information, which are important pieces of information in this embodiment will be described in detail next.

The following four methods can be conceived as methods of generating display mode information:

(1) a method of generating information on the basis of the setting made by a hardware switch arranged on the computer;

(2) a method of generating information on the basis of the setting made by a hardware switch arranged on the display;

(3) a method of generating information on the basis of the setting made by a switch on software in the computer; and (4) a method of generating information on the basis of the setting made by a switch on software in the display.

Figure 5:
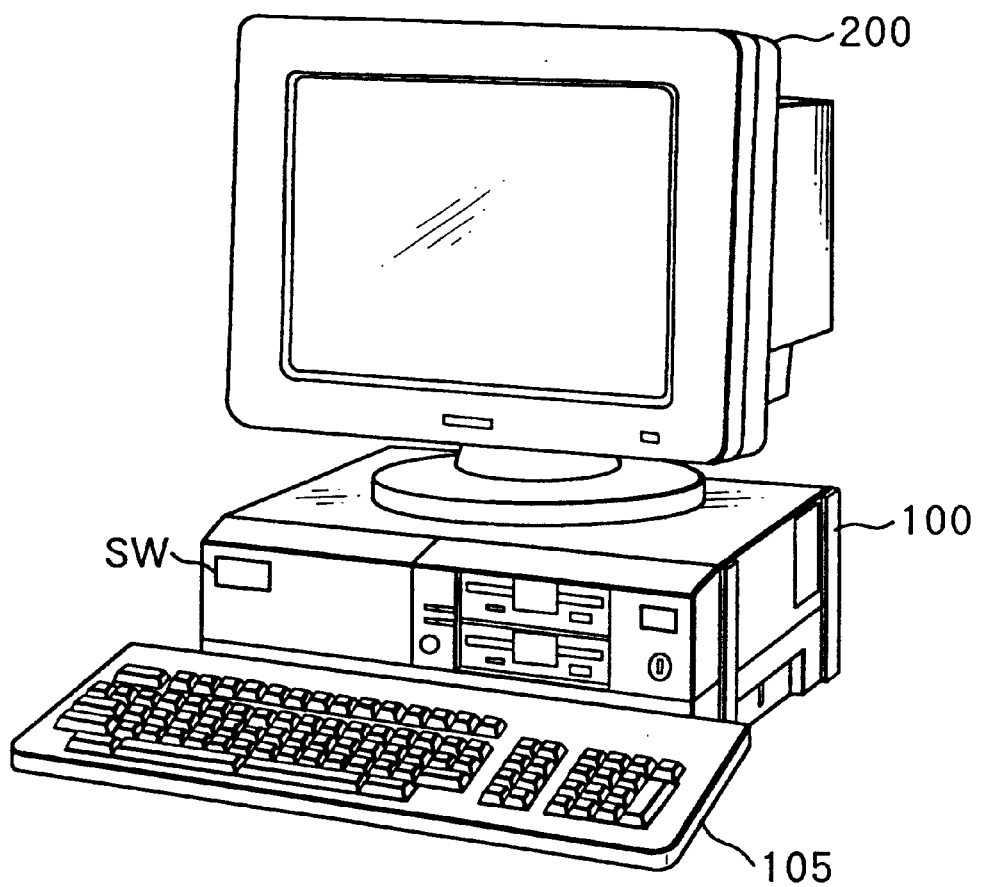
FIG. 5 is a perspective view showing an apparatus designed to set a display mode with a hardware switch on the computer side.
Figure 6:
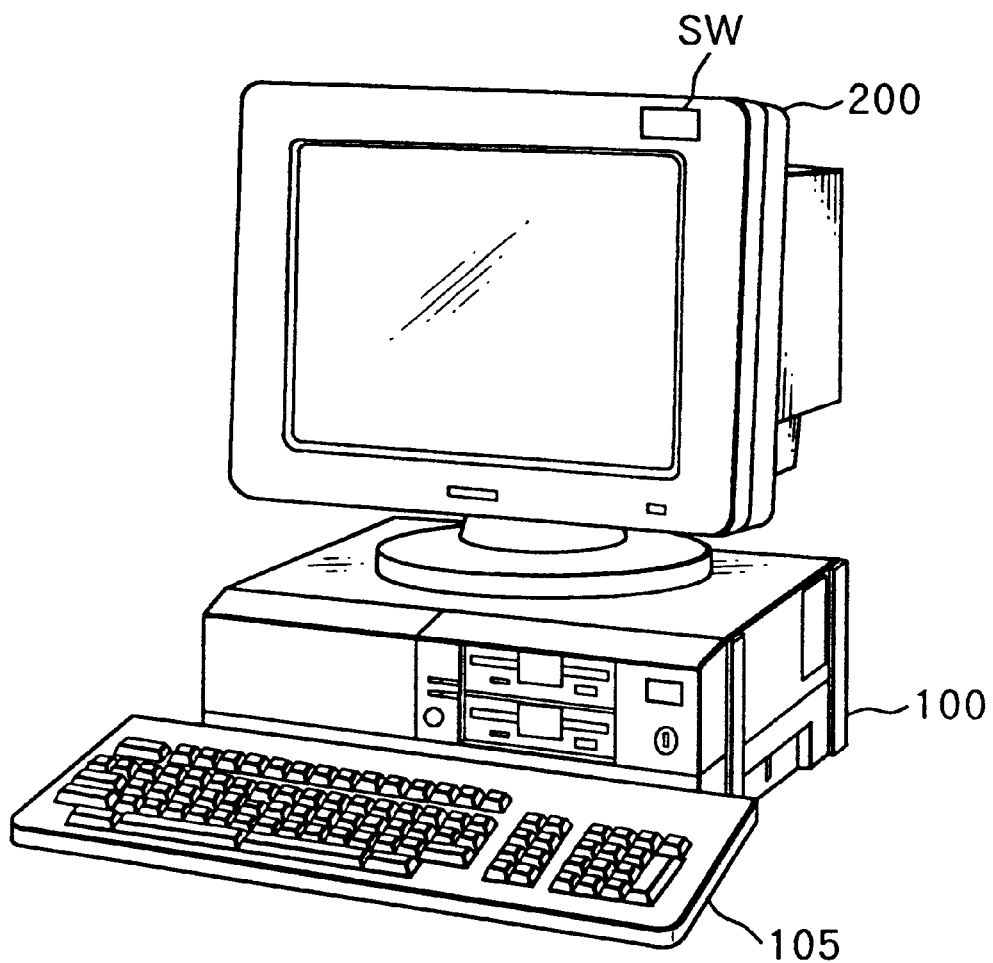
FIG. 6 is a perspective view showing an apparatus designed to set a display mode with a hardware switch on the display side.

FIG. 5 is a schematic perspective view of the apparatus using method (1) described above. FIG. 6 is a schematic perspective view of the apparatus using method (2) described above. Referring to FIGS. 5 and 6, reference symbol SW denotes a switch for switching the 2D and 3D display modes. Note that the switch SW is included in the input unit 105.

In addition to the above two types of display modes (2D and 3D display modes), a plurality of parameters such as a parameter that limits a criterion for determining the execution of 3D display or the time during which 3D display is to be performed, a parameter that limits the size of a 3D area, and the like can be set. When there are many items to be set as in this case, setting can be performed more easily with software switches as in methods (3) and (4).

Figure 7:
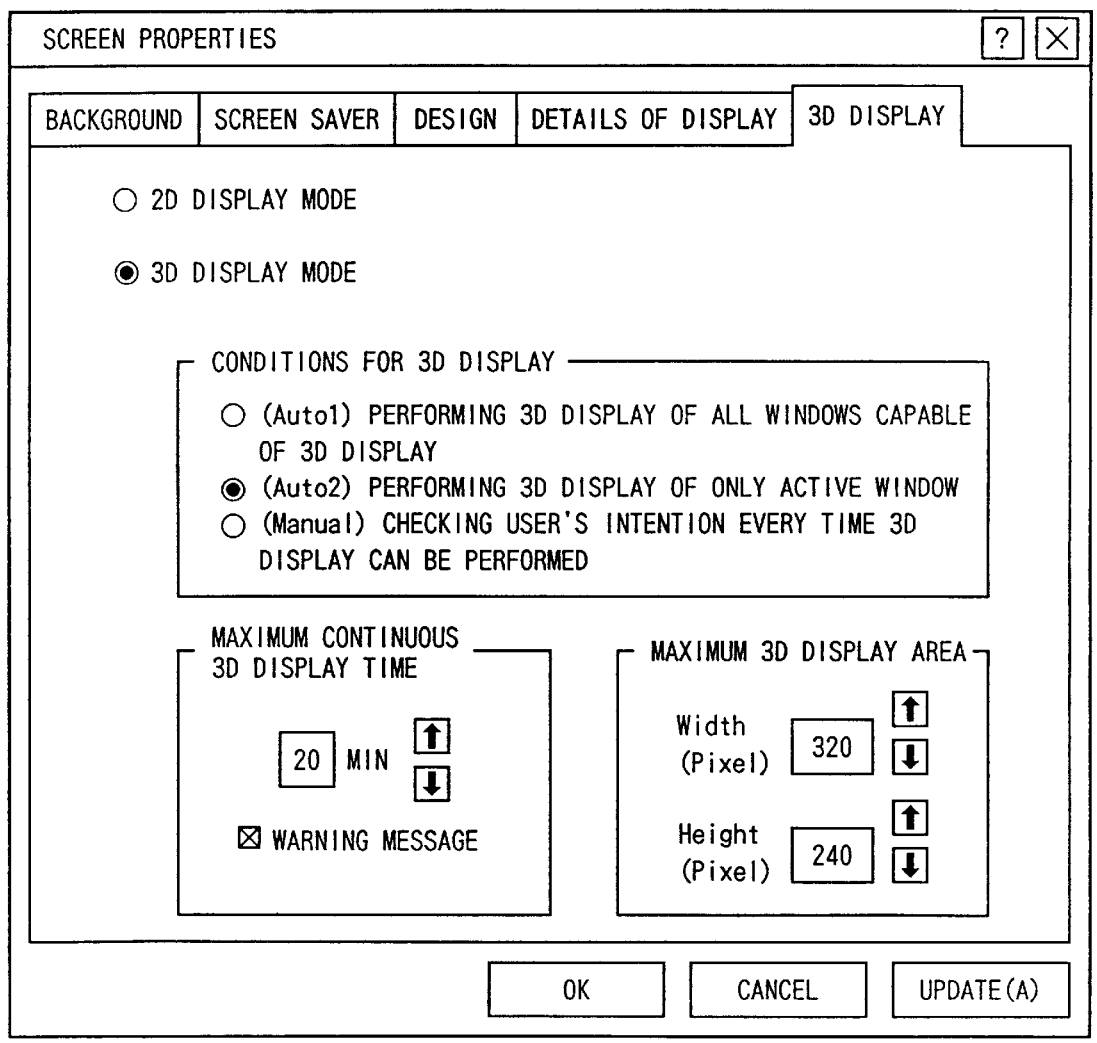
FIG. 7 is a view showing a user interface used for "display mode" setting.

A setting operation based on method (3) will be described in detail below. In general, when an operation is to be performed by using a computer, a systematic operation environment is constructed by using software called an operating system (to be referred to as an OS hereinafter), and various application software programs are operated on the OS. Setting associated with an operation environment such as display mode setting for a display is often performed by using an environment setting application incorporated in the OS in advance. FIG. 7 shows an example of how the above display mode setting operation is performed on a "display" setting menu in an environment setting application in "Windows 95" (trademark) of Microsoft Corporation, which is a typical OS of personal computers (to be referred to as PCs hereinafter).

Display mode setting is performed on a "3D display" setting menu on the "display" setting window. The user selects either the 2D display mode or the 3D display mode on this menu. If the user selects the 3D display mode, he/she can further set parameters that define conditions for 3D display, e.g., the maximum continuous 3D display time and the maximum 3D display area. In using an OS having a user interface which activates a plurality of work windows to execute jobs in units of windows, like "Windows 95" (trademark), in particular, beneficial effects can be obtained when the 3D or 2D display mode is set in accordance with the state of each window or the type of image to be processed on each window. Obviously, the user can set the above maximum continuous 3D display time and the maximum 3D display area for each window.

In the case shown in FIG. 7, the user can select a mode (Auto1) of performing 3D display on all windows that handle images which can be displayed as 3D images, a mode (Auto2) of performing 3D display on only the active window of the above windows, or a mode (Manual) of checking the user's intention of performing 3D display every time 3D display can be performed. The user can further set the maximum continuous 3D display time, whether to generate a warning message, and the maximum 3D display area.

Figure 8:
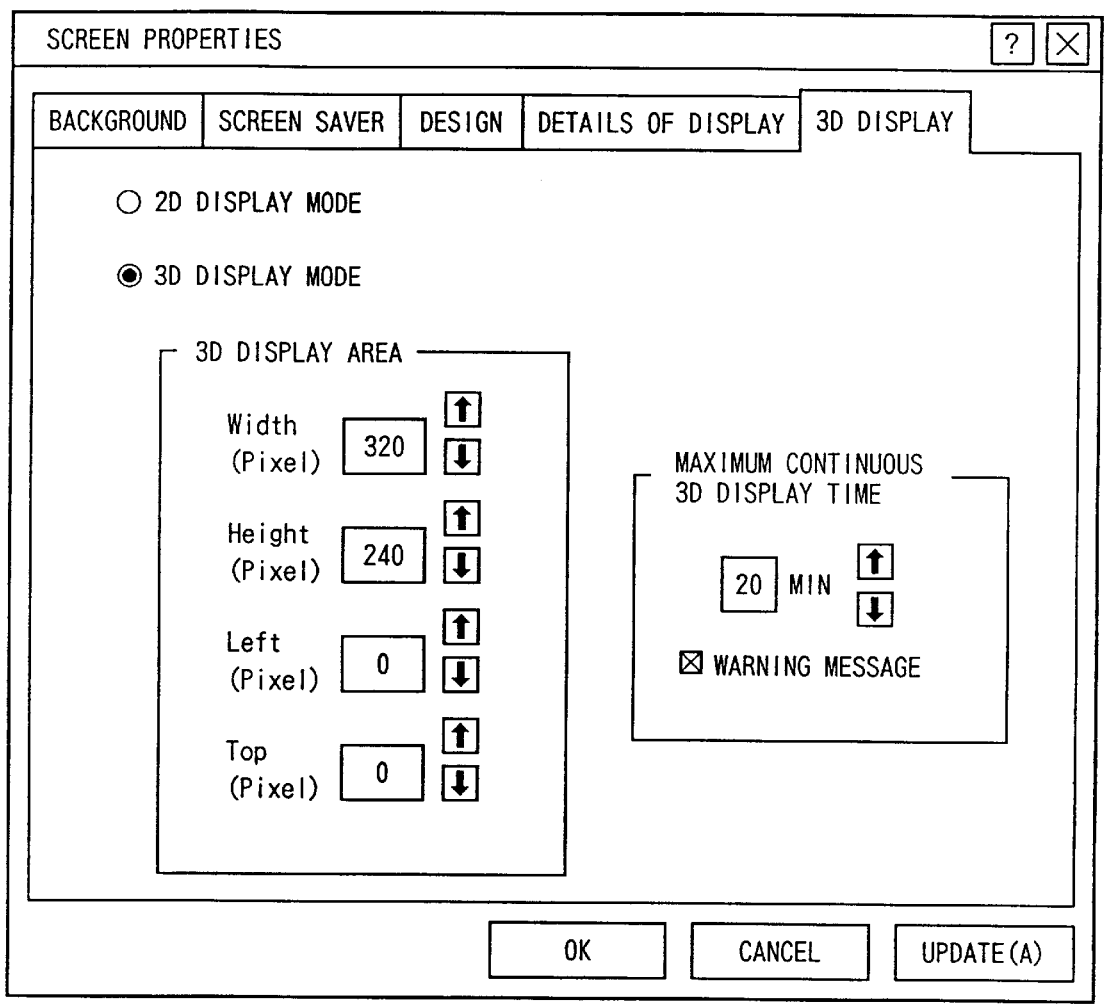
FIG. 8 is a view showing a user interface used for "display mode" setting.

The user may also set a mode of always performing 3D display at/in a specific position/area on the screen independently of windows, with the remaining area serving as a 2D display area. For example, FIG. 8 shows the items to be set in this case. Referring to FIG. 8, set values in "Width" and "Height" indicate the size of the 3D display area, and set values in "Left" and "Top" indicate the position of the 3D display area.

Figure 9:
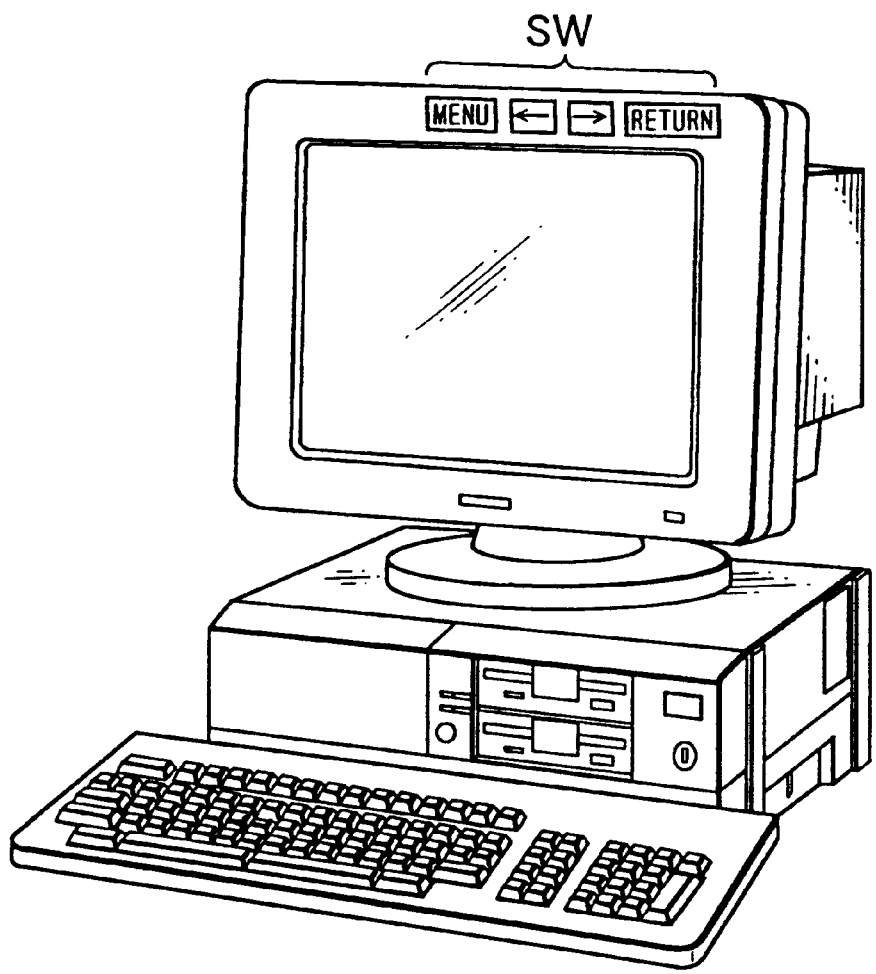
FIG. 9 is a perspective view showing an apparatus designed to set a display mode by means of software on the display side.

Similarly, in method (4) described above, the same display mode setting screen as that in method (3) described above is displayed on the display to allow the user to perform a setting operation. In this case, various selection buttons (arrow keys, a confirmation key, and the like) are arranged on the display, as shown in FIG. 9, to allow the user to make various settings. Methods (2) and (4), however, require an arrangement for notifying the host computer 100 of the contents of settings made on the display side.

When a display mode can be set on the display side as in methods (2) and (4), the display made detection unit 221 notifies the display mode setting unit 121 of the set display mode through the communication unit including the interfaces 202 and 106 and the connection cable 300. The display mode determination processing in step S12 is therefore performed on the basis of the display mode notified by the display mode detection unit 221. Furthermore, in this case, the display mode detection unit may perform determination processing in step S32 in FIG. 4 in accordance with the display mode set on the display side. With this operation, the display mode information can be omitted from the information notified from the host computer 100.

A method of generating 3D display information will be described next. As shown in FIG. 2 as well, when the 3D display mode is set, pieces of 3D display information are generated in the host computer. These pieces of information are generated in a proper format on the basis of various pieces of information in the display mode set by the user. An information generation method for each display mode setting will be described below.

(1) Setting 3D Display Area for Each Window

A case in which the OS of the computer has a user interface for executing jobs in units of windows, like "Windows 95" (trademark), and 3D display areas are set in units of windows will be described first.

In general, the OS generates a window in response to a request from an application. The application determines information (size and position) required to generate a window, and the OS prepares for the generation of the window by referring to the information. When, for example, an image is to be displayed upon reading an existing image source file, the application determines the size of a window by referring to the information (resolution, size, and the like) written in the image source file, and outputs an instruction for generating a window corresponding to the determined size to the OS. When an image is to be generated in real time as well, the application determines the size and resolution of the image first, and the OS then executes an instruction for generating a window corresponding to the determined size, thus drawing the image. In addition, the application determines the proper position of the window in accordance with the operation state, and transfers the corresponding information to the OS. In most cases, a window can be moved to an arbitrary place in accordance with the user's intention, and the position information of the destination of the window is also detected by the application and transferred to the OS.

These pieces of position and area information of a window are generated by an application, and the OS acquires them. When, therefore, 3D display areas are to be controlled in units of windows, 3D display information may be generated on the basis of these pieces of information transferred from an application to the OS.

If, however, a 2D image is to be displayed in a window, or the 3D display conditions ("maximum 3D display area", "window is active", and the like) set in the process of setting a display mode are not satisfied, no 3D display information should be generated for this window. The 3D information generation unit 122 in FIG. 2 therefore generates 3D display information while performing such determination processing.

Figure 10:
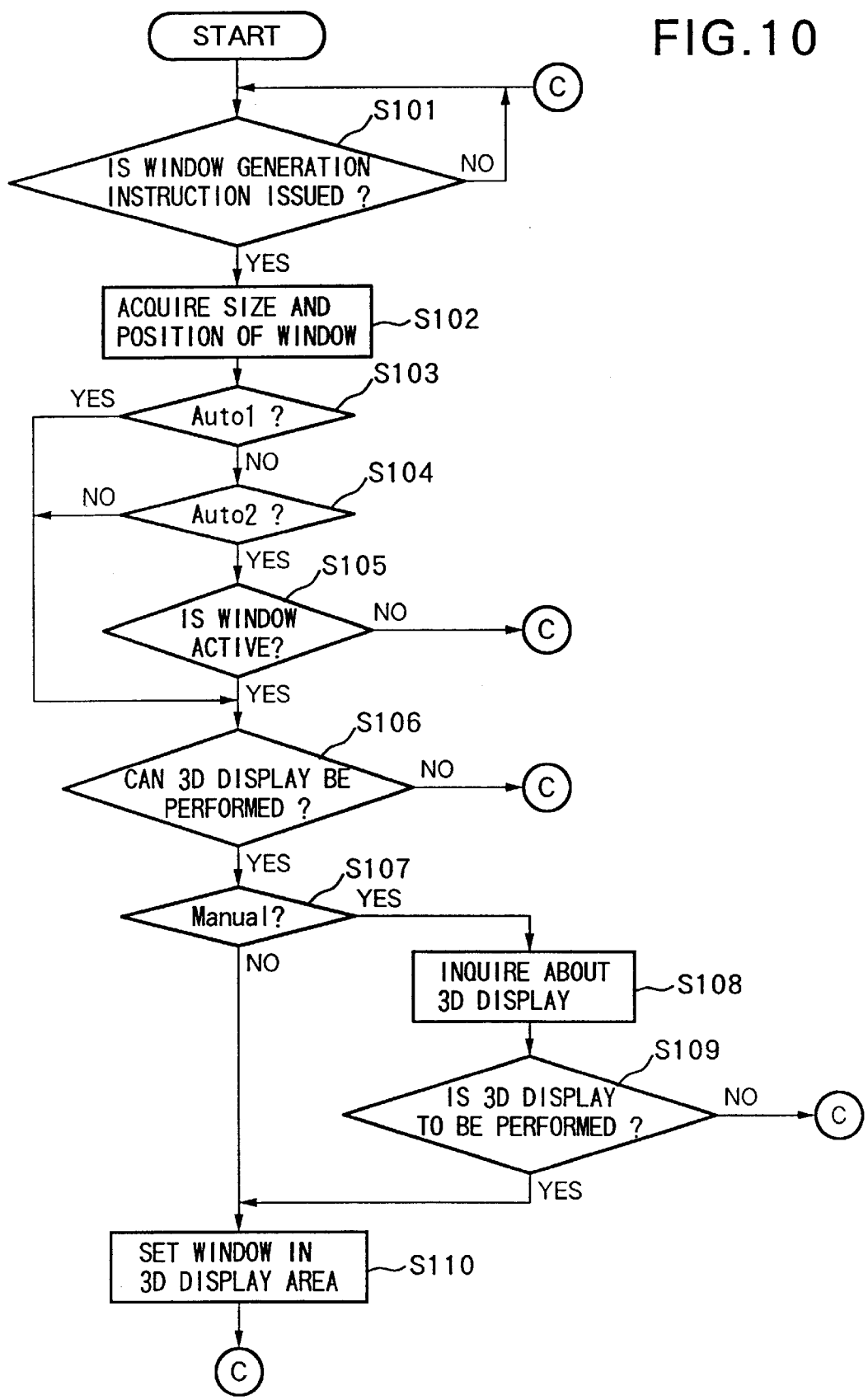
FIG. 10 is a flow chart for explaining a procedure for generating 3D display position/area signals in units of windows.
Figure 12A:
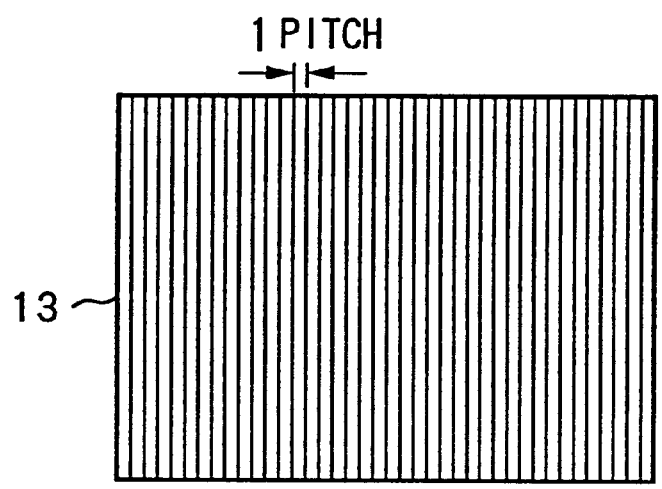
FIGS. 12A and 12B are views each showing an actual case in which mixed 2D/3D display is realized in the stereoscopic image display apparatus of the parallax barrier scheme.
Figure 12B:
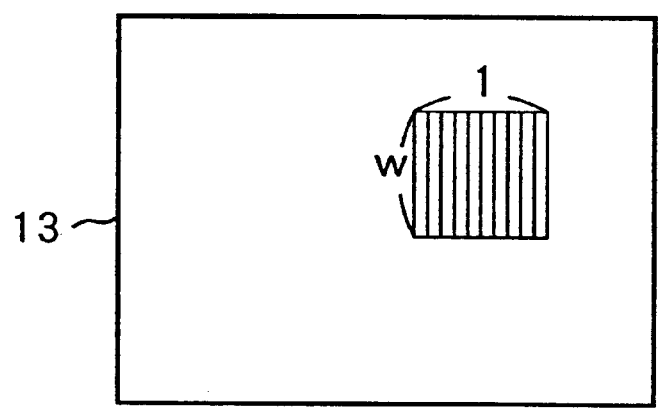

FIG. 10 is a flow chart for explaining a procedure for generating 3D display position/area signals in units of windows. Note that this processing is executed when the 3D display mode is designated.

In step S101, it is checked whether an application has issued a window generation instruction to the OS. If the window generation instruction is detected, the flow advances to step S102 to acquire pieces of information indicating the size and position of the window which are contained in the window generation instruction. If "Auto 1" is designated on the menu shown in FIG. 7, since all windows capable of 3D display are set as windows subjected to 3D display, the flow advances to step S106. If "Auto 2" is designated, since only an active window becomes a window to be subjected to 3D display, the flow advances to step S105 to check whether the window is active. If it is determined that the window is active, the flow advances to step S106. Otherwise, the flow returns to step S101.

In step S106, it is checked whether 3D display of the contents to be displayed in the window can be performed. If it is determined that 3D display can be performed, the flow advances to step S107. Otherwise, the flow returns to step S101.

In step S107, it is checked whether "Manual" is designated. If it is determined that "Manual" is not designated, the flow advances to step S110 to set the pieces of position and area information of the window as pieces of information subjected to 3D display processing. If it is determined in step S107 that "Manual" is designated, the flow advances to step S108 to inquire of the user whether he/she wishes to perform 3D display in the window. If the user's replay to this inquiry is "YES", the flow advances to step S110 to set the pieces of position and area information of the window as pieces of information to be subjected to 3D display processing. If the user's replay is "NO", the flow returns to step Pieces of 3D display information are generated in units of windows in the above manner. Assume that the displayed window is switched from the active state to the inactive state, or from the inactive state to the active state. In this case, every time "Auto 1" is selected, the pieces of 3D display position and area information are updated. A window generation instruction in step S101 therefore contains information about a given window which is changed from the active state to the inactive state or from the inactive state to the active state.

In the "Manual" mode, every time a window is switched from the active state to the inactive state, it is checked whether to perform 3D display.

Note that the 3D information generation unit 122 may be incorporated in an application or prepared by the OS. In addition, the corresponding portion may be replaced with hardware. In any case, the pieces of 3D display position and area information generated by the 3D display control unit 222 are converted into a signal having a format suited to transmission, and the signal is output to the display 200 through the above communication unit.

(2) Fixed 3D Display Area

When a 3D display area is designated on the display mode setting menu in FIG. 8, 3D display is always performed at/in a specific position/area on the screen independently of windows, and 2D display is performed in the remaining area. In this case, 3D display information is fixed and notified to the display 200 through the above communication unit.

As long as the above display mode continues on the display, 3D display position/area control on the specific area is continuously performed.

(3) Combining modes (1) and (2)

3D display may be performed in a display mode set as a combination of modes (1) and (2). In this mode, therefore, 3D display is performed in units of windows within a predetermined area. In this case, it suffices if a 3D display position and area are obtained by the method in mode (1), and pieces of information are generated by setting an area where the obtained area overlaps a fixed 3D area as a true 3D display position and area.

As described above, according to the above embodiment, there is provided a computer system which can control the image information generated by a computer upon dividing an arbitrary area on the screen into 2D and 3D display areas by using a stereoscopic image display apparatus capable of performing mixed display of 2D and 3D images.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As has been described above, according to the present invention, in an image display capable of performing mixed display of 2D and 3D images, a 3D display area can be arbitrarily set.

In addition, according to the present invention, in a window display system, the 3D and 2D display modes can be switched in units of windows.

As many apparently widely different embodiments of the present invention can be made without departing from the spirit and scope thereof, it is to be understood that the invention is not limited to the specific embodiments thereof except as defined in the claims.

What is claimed is:

1. An image display system including an image display apparatus capable of mixed display of 2D and 3D images, comprising:

first generation means for generating image data to be displayed on an image screen of said image display apparatus;

second generation means for generating area information indicating an image area of the image data, which is to be displayed as a 3D image generated by said first generation means;

providing means for providing said image display apparatus with the image data to which the area information is attached; and control means for controlling said display apparatus to display the image data, and controlling the 2D and 3D image displays on a basis of the area information attached to the image data.

2. The system according to claim 1, further comprising third generation means for generating display mode information indicating whether to perform mixed display of 2D and .3D images, and wherein said control means controls 2D image display and 3D image display performed by said image display apparatus when the display mode information indicates execution of mixed display.

3. The system according to claim 2, further comprising setting means for performing a setting operation to determine whether to perform mixed display of 2D and 3D images, and wherein said third generation means generates the display mode information on the basis of contents set by said setting means.

4. The system according to claim 3, wherein said image display system further comprises said image display apparatus and a host apparatus for supplying image data to said image display apparatus, and said setting means is a hardware switch provided for said host apparatus.

5. The system according to claim 3, wherein said image display system further comprises said image display apparatus and a host apparatus for supplying image data to said image display apparatus, and said setting means is a hardware switch provided for said image display apparatus.

6. The system according to claim 3, wherein said image display system further comprises said image display apparatus and a host apparatus for supplying image data to said image display apparatus, and said setting means is incorporated in software executed by said host apparatus.

7. The system according to claim 6, wherein said software is incorporated in an operating system.

8. The system according to claim 6, wherein said software is incorporated in an application program.

9. The system according to claim 3, wherein said image display system further comprises said image display apparatus and a host apparatus for supplying image data to said image display apparatus, and said setting means is incorporated in software executed by said image display apparatus.

10. The system according to claim 2, wherein said first generation means converts 3D display image data into 2D display image data when the display mode information generated by said third generation means indicates a mode of displaying only a 2D image.

11. The system according to claim 1, wherein the image data corresponds to multi-window display, and said second generation means acquires information about window display which is to be exchanged between an application program and an operating system, and generates the area information on the basis of the information about window display.

12. The system according to claim 11, further comprising determination means for determining for each of the plurality of windows whether data corresponding to 3D display is contained, and wherein said second generation means generates the area information on the basis of a display area of a window determined as a window containing data corresponding to 3D display by said determination means.

13. The system according to claim 12, wherein said determination means generates the area information on the basis of a display area of a window, of the plurality of windows, which is active and contains data corresponding to 3D display.

14. The system according to claim 12, wherein said determination means generates the area information on the basis of a display area of a window, of the plurality of windows, which contains data corresponding to 3D display and designated as a window to be subjected to 3D display.

15. An image display apparatus capable of performing mixed display of 2D and 3D images, comprising:

first reception means for receiving image data to be displayed on an image screen of said image display apparatus;

second reception means for receiving area information indicating an image area of the image data, which is to be displayed as a 3D image, the area information being attached to the image data and being received together with the image data; and control means for controlling 2D image display and 3D image display of the image data on the basis of the area information attached to the image data when an image formed based on the image data is displayed.

16. The apparatus according to claim 15, further comprising third reception means for receiving display mode information indicating whether to perform mixed display of 2D and 3D images, and wherein said control means controls 2D image display and 3D image display performed by said image display apparatus on the basis of the area information when the display mode information indicates execution of mixed display.

17. The apparatus according to claim 15, further comprising setting means for setting a display mode indicating whether to perform mixed display of 2D and 3D images, and notification means for notifying a destination of the image data of the display mode information set by said setting means, and wherein said control means controls 2D image display and 3D image display performed by said image display apparatus on the basis of the area information when the display mode set by said setting means indicates execution of mixed display.

18. An information processing apparatus which can be connected to an image display apparatus capable of performing mixed display of 2D and 3D images, comprising:

first generation means for generating image data containing both 2D and 3D image data;

second generation means for generating area information indicating a position and a size of a 3D display area of the image data generated by said first generation means; and output means for outputting the image data and the area information which is attached to the image data, to said image display apparatus.

19. The apparatus according to claim 18, further comprising third generation means for generating display mode information indicating whether to perform mixed display of 2D and 3D images, and
wherein said output means outputs the image data, the area information, and the display mode information to said image display apparatus.

20. The apparatus according to claim 19, further comprising setting means for performing a setting operation to determine whether to perform mixed display of 2D and 3D images, and
wherein said third generation means generates the display mode information on the basis of contents set by said setting means.

21. The apparatus according to claim 19, wherein said first generation means converts 3D display image data into 2D display image data when the display mode information generated by said third generation means indicates a mode of displaying only a 2D image.

22. The apparatus according to claim 18, wherein the image data corresponds to multi-window display, and
said second generation means acquires information about window display which is to be exchanged between an application program and an operating system, and generates the area information on the basis of the information about window display.

23. The apparatus according to claim 22, further comprising determination means for determining for each of the plurality of windows whether data corresponding to 3D display is contained, and
wherein said second generation means generates the area information on the basis of a display area of a window determined as a window containing data corresponding to 3D display by said determination means.

24. The apparatus according to claim 22, wherein said determination means generates the area information on the basis of a display area of a window, of the plurality of windows, which is active and contains data corresponding to 3D display.

25. The apparatus according to claim 22, wherein said determination means generates the area information on the basis of a display area of a window, of the plurality of windows, which contains data corresponding to 3D display and designated as a window to be subjected to 3D display.

26. A method of controlling an image display system including an image display apparatus capable of mixed display of 2D and 3D images, comprising:
a first generation step of generating image data to be displayed on an image screen of said image display apparatus;
a second generation step of generating area information indicating an image area of the image data, which is to be displayed as a 3D image generated in the first generation step;
a providing step of providing said image display apparatus with the image data to which the area information is attached; and
a control step of controlling said display apparatus to display the image data, and controlling the 2D and 3D image display on the basis of the area information attached to the image data.

27. The method according to claim 26, further comprising the third generation step of generating display mode information indicating whether to perform mixed display of 2D and 3D images, and
wherein the control step comprises controlling 2D image display and 3D image display performed by said image display apparatus when the display mode information indicates execution of mixed display.

28. The method according to claim 27, further comprising the setting step of performing a setting operation to determine whether to perform mixed display of 2D and 3D images, and
wherein the third generation step comprises generating the display mode information on the basis of contents set by in the setting step.

29. The method according to claim 28, wherein said image display system further comprises said image display apparatus and a host apparatus for supplying image data to said image display apparatus, and
the setting step is incorporated in software executed by said host apparatus.

30. The method according to claim 29, wherein the software is incorporated in an operating system.

31. The method according to claim 29, wherein the software is incorporated in an application program.

32. The method according to claim 28, wherein said image display system further comprises said image display apparatus and a host apparatus for supplying image data to said image display apparatus, and
the setting step is incorporated in software executed by said image display apparatus.

33. The method according to claim 27, wherein the first generation step comprises converting 3D display image data into 2D display image data when the display mode information generated in the third generation step indicates a mode of displaying only a 2D image.

34. The method according to claim 26, wherein the image data corresponds to multi-window display, and
the second generation step comprises acquiring formation about window display which is to be exchanged between an application program and an operating system, and generating the area information on the basis of the information about window display.

35. The method according to claim 34, further comprising the determination step of determining for each of the plurality of windows whether data corresponding to 3D display is contained, and
wherein the second generation step comprises generating the area information on the basis of a display area of a window determined as a window containing data corresponding to 3D display in the determination step.

36. The method according to claim 34, wherein the determination step comprises generating the area information on the basis of a display area of a window, of the plurality of windows, which is active and contains data corresponding to 3D display.

37. The method according to claim 34, wherein the determination step comprises generating the area information on the basis of a display area of a window, of the plurality of windows, which contains data corresponding to 3D display and designated as a window to be subjected to 3D display.

38. A method of controlling an image display apparatus including an image display unit capable of performing mixed display of 2D and 3D images, comprising:
a first reception step of receiving image data to be displayed on an image screen of said image display apparatus;
a second reception step of receiving area information indicating an image area of the image data, which is to be displayed as a 3D image, the area information being attached to the image data and being received together with the image data; and a control step of controlling 2D image display and 3D image display of the image data on the basis of the area information attached to the image data when an image formed based on the image data is displayed.

39. The method according to claim 38, further comprising the third reception step of receiving display mode information indicating whether to perform mixed display of 2D and 3D images, and wherein the control step comprises controlling 2D image display and 3D image display performed by said image display unit on the basis of the area information when the display mode information indicates execution of mixed display.

40. The method according to claim 38, further comprising the setting step of setting a display mode indicating whether to perform mixed display of 2D and 3D images, and the notification step of notifying a destination of the image data of the display mode information set by the setting step, and wherein the control step comprises controlling 2D image display and 3D image display performed by said image display apparatus on the basis of the area information when the display mode set in the setting step indicates execution of mixed display.

41. A method of controlling an information processing apparatus which can be connected to an image display apparatus capable of performing mixed display of 2D and 3D images, comprising:

a first generation step of generating image data containing both 2D and 3D image data;

a second generation step of generating area information indicating a position and a size of a 3D display area of the image data generated in the first generation step; and an output step of outputting the image data and the area information which is attached to said image data, to said image display apparatus.

42. The method according to claim 41, further comprising the third generation step of generating display mode information indicating whether to perform mixed display of 2D and 3D images, and wherein the output step comprises outputting the image data, the area information, and the display mode information to said image display apparatus.

43. The method according to claim 42, further comprising the setting step of performing a setting operation to determine whether to perform mixed display of 2D and 3D images, and wherein the third generation step comprises generating the display mode information on the basis of contents set in the setting step.

44. The method according to claim 42, wherein the first generation step comprises converting 3D display image data into 2D display image data when the display mode information generated by in the third generation step indicates a mode of displaying only a 2D image.

45. The method according to claim 41, wherein the image data corresponds to multi-window display, and the second generation step comprises acquiring information about window display which is to be exchanged between an application program and an operating system, and generates the area information on the basis of the information about window display.

46. The method according to claim 45, further comprising the determination step of determining for each of the plurality of windows whether data corresponding to 3D display is contained, and wherein the second generation step comprises generating the area information on the basis of a display area of a window determined as a window containing data corresponding to 3D display in the determination step.

47. The method according to claim 45, wherein the determination step comprises generating the area information on the basis of a display area of a window, of the plurality of windows, which is active and contains data corresponding to 3D display.

48. The method according to claim 45, wherein the determination step comprises generating the area information on the basis of a display area of a window, of the plurality of windows, which contains data corresponding to 3D display and designated as a window to be subjected to 3D display.

49. A storage medium storing a control program for controlling an image display apparatus including an image display unit capable of performing mixed display of 2D and 3D images, the control program comprising:

code of a first reception step of receiving image data to be displayed on an image screen of said image display apparatus;

code of a second reception step of receiving area information indicating an image area of the image data, which is to be displayed as a 3D image, the area information being attached to the image data and being received together with the image data; and code of a control step of controlling 2D image display and 3D image display of the image data on the basis of the area information attached to said image data when an image formed based on said image data is displayed.

50. A storage medium storing a control program for generating display information for an image display apparatus capable of performing mixed display of 2D and 3D images, the control program comprising:

code of a first generation step of generating image data containing both 2D and 3D image data;

code of a second generation step of generating area information indicating a position and a size of a 3D display area of the image data generated in the first generation step; and code of an output step of outputting the image data and the area information which is attached to said image data, to said image display apparatus.

* * * * *

UNITED STATES PATENT AND TRADEMARK OFFICE
CERTIFICATE OF CORRECTION

PATENT NO. : 6,285,368 B1  
DATED : September 4, 2001  
INVENTOR(S) : Toshiyuki Sudo et al.

Page 1 of 1

It is certified that error appears in the above-identified patent and that said Letters Patent is hereby corrected as shown below:

Title page,
Item [56], References Cited, "5-122733 5/1983 (JP)." should read -- 5-122733 5/1993 (JP). --; and "09015532 1/1997 (JP)." should read -- 9-15532 1/1997 (JP). --.

Column 8,
Line 43, "by - using" should read -- by using --.

Column 11,
Line 31, "replay" should read -- reply --; and
Line 35, "replay" should read -- reply --; and "step" should read -- step S101. --.

Column 13,
Line 15, ".3D" should read -- 3D --.

Column 14,
Line "prising" should read -- prising: --.

Signed and Sealed this

Twenty-third Day of April, 2002

Attest:

JAMES E. ROGAN
*Attesting Officer*  *Director of the United States Patent and Trademark Office*